(12) United States Patent
Baldanza et al.

(10) Patent No.: US 7,789,219 B2
(45) Date of Patent: Sep. 7, 2010

(54) DEVICE AND METHOD FOR CHANGING AUTOMATICALLY THE SIZE OF PACKS IN A CONVEYOR, IN PARTICULAR FOR AN AUTOMATIC PACKAGING MACHINE

(75) Inventors: Luca Baldanza, Calderara di Reno (IT); Andrea Cinotti, Calderara di Reno (IT); Giuliano Bertusi, Calderara di Reno (IT)

(73) Assignee: KPL Packaging S.p.A., Bologna (IT)

( * ) Notice: Subject to any disclaimer, the term of this patent is extended or adjusted under 35 U.S.C. 154(b) by 496 days.

(21) Appl. No.: 11/241,348

(22) Filed: Sep. 30, 2005

(65) Prior Publication Data

US 2006/0080945 A1    Apr. 20, 2006

(51) Int. Cl.
*B65G 31/00* (2006.01)
*B65G 47/00* (2006.01)

(52) U.S. Cl. ............. 198/803.1; 198/473.1; 198/470.1; 53/531

(58) Field of Classification Search .............. 198/803.1, 198/803.3, 803.7, 803.9, 470.1, 606, 531; 53/233, 234, 257, 531
See application file for complete search history.

(56) References Cited

U.S. PATENT DOCUMENTS 3,509,681 A   5/1970  Sass
3,531,109 A * 9/1970  Lavander et al. ............ 271/204
4,790,224 A * 12/1988 Krutilla et al. .................. 83/53
5,038,549 A * 8/1991  Nordstrom ..................... 53/447
5,331,788 A * 7/1994  Cinotti ......................... 53/228
5,337,887 A   8/1994  Greenwell et al.
5,465,550 A * 11/1995 Dall'Omo ..................... 53/233
5,947,262 A * 9/1999  Boring et al. ............. 198/803.1
6,158,575 A * 12/2000 Hitz ....................... 198/803.14
2002/0059784 A1* 5/2002 Gamberini ................... 53/531

FOREIGN PATENT DOCUMENTS

EP    1 067 048 A1    1/2001
EP    1 312 549 A1    5/2003

OTHER PUBLICATIONS

European Search Report from EP Application No. 04425779.8, Dated Mar. 17, 2005.

* cited by examiner

*Primary Examiner*—Gene Crawford
*Assistant Examiner*—Kavel P Singh
(74) *Attorney, Agent, or Firm*—Patterson & Sheridan, L.L.P.

(57) ABSTRACT

A conveyor device, in particular for an automatic packaging machine for paper rolls, having a horizontal plane of advance, at least one pair of motorized flexible transmission members extending along a closed loop and bearing a plurality of transverse bars fastened to said flexible transmission members, a plurality of thruster elements borne by said bars, and a stationary adjustment station provided with at least one adjustment assembly having a grip organ movable in transverse direction and arranged in such a way as to displace in the transverse direction along the respective bar a thruster element positioned at the grip organ.

10 Claims, 6 Drawing Sheets

DEVICE AND METHOD FOR CHANGING AUTOMATICALLY THE SIZE OF PACKS IN A CONVEYOR, IN PARTICULAR FOR AN AUTOMATIC PACKAGING MACHINE

CROSS-REFERENCE TO RELATED APPLICATIONS

This application claims benefit of European Patent Application serial number 04425779.8, filed Oct. 15, 2004, which is herein incorporated by reference.

BACKGROUND OF THE INVENTION

1. Field of the Invention

The present invention relates to a conveyor device, in particular for an automatic packaging machine, provided with an automatic system for automatically changing the size of packs of products to be conveyed.

2. Description of Related Art

The invention was developed with particular regard to the application to packaging machines for paper rolls. In this sector there is a need to provide the machine with an automatic adjustment system which allows to change the format of the packs of products to be packaged without the manual intervention of operators.

Automatic packaging machines for paper rolls are often provided with a conveyor device comprising a horizontal plane of advance whereon the packs of products to be packaged are made to advance. Said conveyor device comprises a chain conveyor bearing a plurality of transverse bars and a plurality of thruster elements which extend in a transverse direction relative to said bars.

One of the adjustments necessary to adapt the packaging machine to a new format of packs consists of varying the position of the thruster elements in the transverse direction.

A known solution to effect this type of adjustment automatically is described in the document EP 1 312 549. In the solution described in this document, the conveyor device comprises a plurality of chains, each of which bears a respective series of thruster elements. The adjustment of the distance in transverse direction between the thruster elements is obtained by varying the relative distance between the chains.

The displacement of the chains in the transverse direction entails the need substantially to modify the entire structure of the conveyor with respect to a traditional machine lacking the automatic size change device.

SUMMARY OF THE INVENTION

The object of the present invention is to provide a device and a method for changing automatically the size of the packages of products in a conveyor device that can be applied to conventional machines lacking the automatic size change system without having to change the entire structure of the conveyor device.

According to the present invention, said object is achieved by a method having the characteristics set out in the claims.

BRIEF DESCRIPTION OF THE DRAWINGS

The present invention shall be described in detail with reference to the accompanying drawings, provided purely by way of non-limiting example, in which.

DETAILED DESCRIPTION OF THE PREFERRED EMBODIMENT

With reference to the drawings, the reference number 10 designates a conveyor device comprised in an automatic packaging machine for paper rolls. The conveyor device 10 comprises a horizontal plane of advance 12 along which the packs to be packaged P (only one whereof is shown in FIG. 1) are made to advance in the direction indicated by the arrow.

Figure 1:
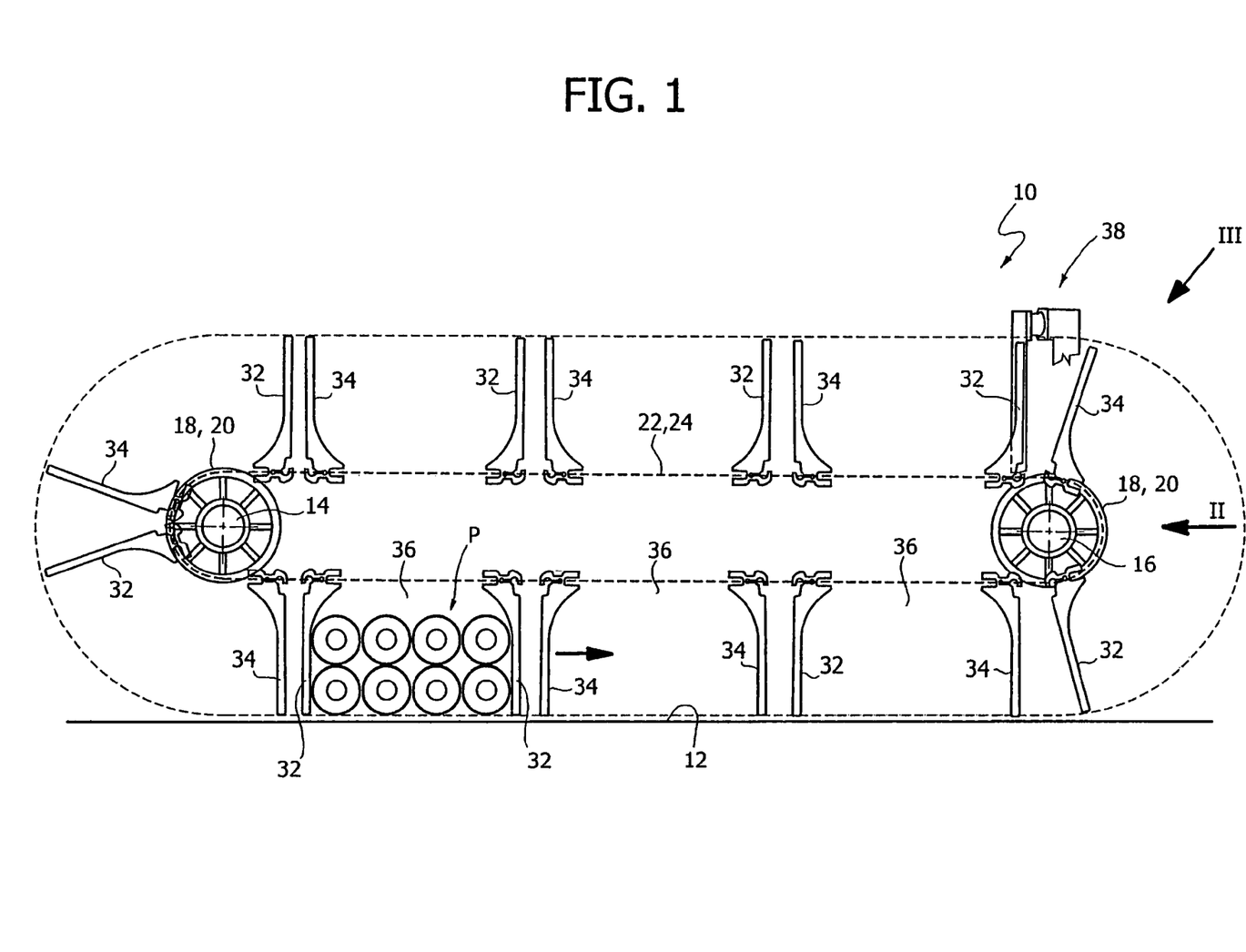
FIG. 1 is a schematic lateral view of a conveyor device according to the present invention.
Figure 2:
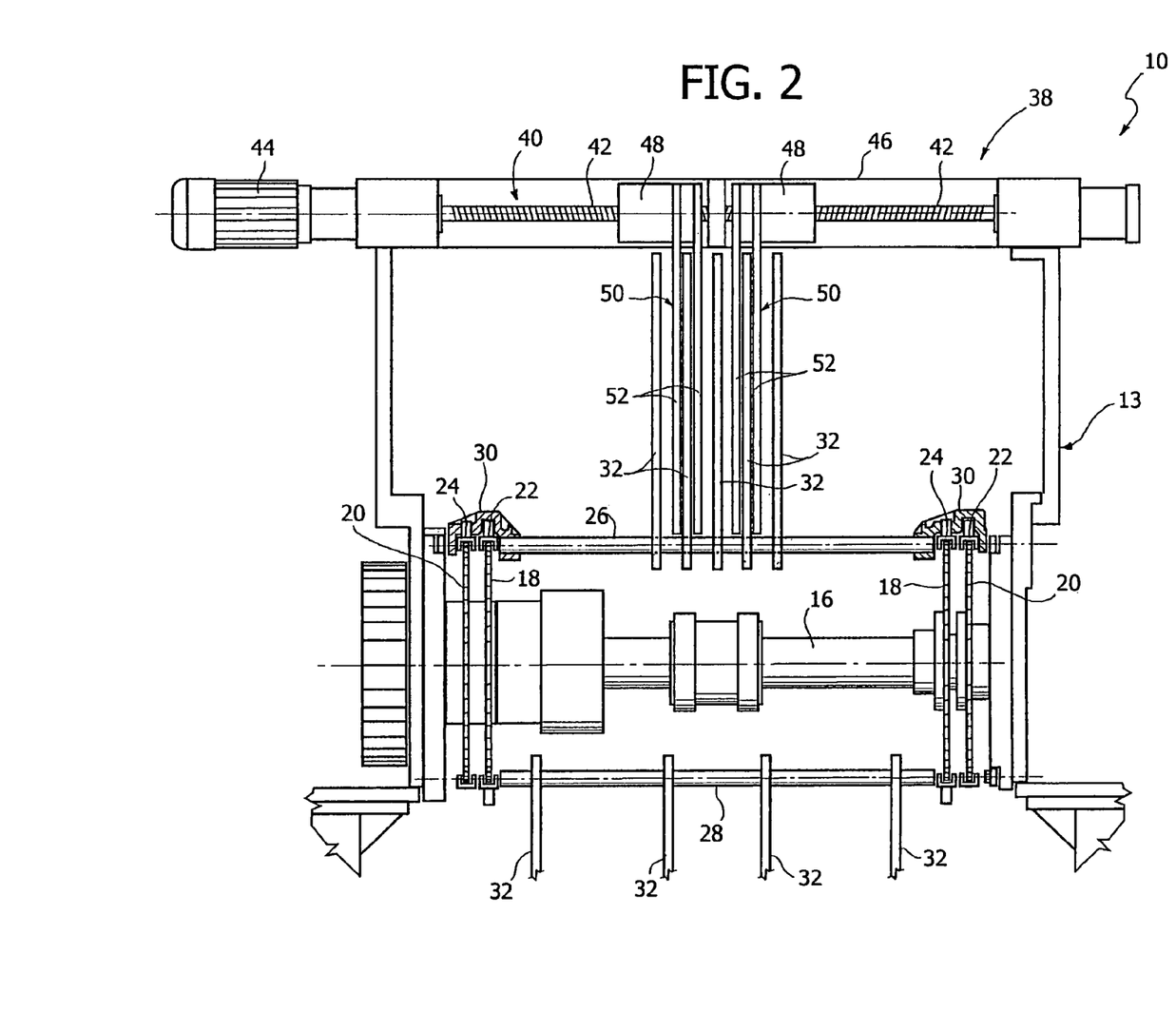
FIG. 2 is a schematic view according to the arrow 11 of FIG. 1.

With reference to FIGS. 1 and 2, the conveyor device 10 comprises a stationary support structure 13 which bears two parallel shafts 14, 16, at least one whereof is motorised. Each shaft 15, 16 bears two pairs of gearwheels 18, 20. The first pair of gearwheels 18 co-operates with a first pair of chains 22. The second pair of gearwheels 20 co-operates with a second pair of chains 24. The first and the second pair of chains 22, 24 bear respective series of transverse bars 26, 28. The transverse bars 26, 28 are fastened to the chains 22, 24 by means of attachment elements 30.

The first and the second series of transverse bars 26, 28 bear a first and a second series of thruster elements 32, 34. With reference to FIG. 1, the thruster elements facing each other 32, 34 define a series of compartments 36 able to receive the packs of products P. In the normal operation of the conveyor device 10, the chains 22, 24 advance at the same speed so the dimensions of the compartments 36 remain constant. The dimension of the compartments 36 in the longitudinal direction (i.e. in a direction parallel to the direction of advance indicated by the arrow in FIG. 1) can be varied by changing the phase between the chains 22, 24.

The present invention specifically relates to a system for adjusting the dimension of the compartments 36 in transverse direction, i.e. orthogonally to the direction of advance of the products P along the plane of advance 12. To each transverse bar 26 or 28 are fastened a plurality of thruster elements 32 or 34. The adjustment in the transverse direction of the dimension of the compartments 36 is effected moving the thruster elements 32 or 34 in a transverse direction along the respective bars 26 or 28. Said movement is effected in a stationary adjustment station 38.

With reference to FIG. 2, the adjustment station 38 comprises at least one adjustment assembly 50 movable in transverse direction and able to engage and displace in transverse direction the thruster element 32, 34 which from time to time is positioned at the adjustment assembly by effect of the motion of the chains 22, 24. The transverse displacement of the or of each adjustment assembly 50 can be obtained by means of electrical actuation devices or with fluid actuators (pneumatic or hydraulic) operating under the command of a control unit which commands the advance of the chains 22, 24 and which selectively stops the advance of the chains when an array of thruster elements is situated at the adjustment station. As shall be described more in detail hereafter, during the adjustment operation the chains 22, 24 advance in steps to bring successive transverse arrays of thruster elements 32, 34 at the adjustment station 38. The advance of the chains resumes after the or each adjustment assembly has completed the transverse displacement of the respective thruster element 32, 34 towards the new position.

In the embodiment illustrated by way of example in FIG. 2, the adjustment station 38 comprises a transverse screw 40 provided with two portions with opposite thread 42. The screw 40 is actuated in rotation by a motor 44 associated to an encoder. The stationary support structure 13 bears a transverse guide 46 along which are movable two shoes 48 each of which bears an adjustment assembly 50 formed by two parallel grip elements 52 positioned according to a fork configuration. The two grip elements 52 of each adjustment assembly 50 are mutually distanced by a quantity that is slightly greater than the dimension in the transverse direction of a thruster element 34 in such a way as to be able to receive between them a thruster element as illustrated in FIG. 2.

Figure 6:
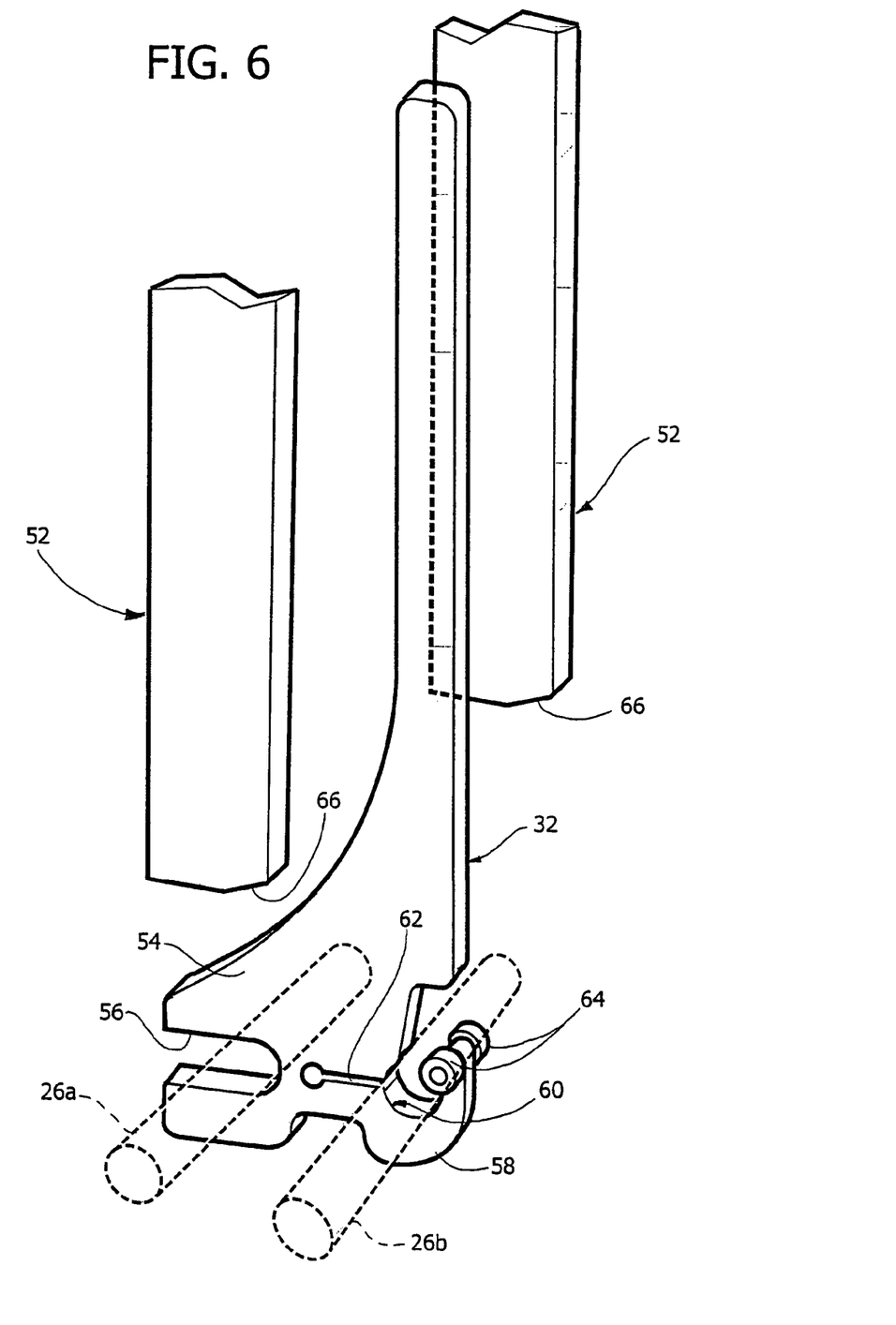
FIG. 6 is an exploded perspective view in enlarged scale of the part indicated by the arrow VI in Figure IV.

With reference in particular to FIG. 6, each thruster element 32 or 34 has an attachment portion 54 provided with two seats able to engage two parallel bars 26 or 28. In FIG. 6, the two parallel bars engaged by the thruster element 32 are designated by the references 26a and 26b. The attachment portion 54 has an elongated seat 56 open on a frontal side and ending with a curved bottom wall. The seat 56 engages the outer surface of the bar 26a with slight play, such as not to prevent the thruster element 32 from sliding in transverse direction relative to the bar 26a.

The attachment portion 54 of each thruster element 32 or 34 is also provided with an elastically deformable hook portion 58. The hook portion 58 has an engagement seat 60 which engages the outer surface of the bar 26b by forcing. When the hook portion 58 of the thruster element 32 engages the bar 26b, the thruster element 32 is fastened to both bars 26a, 26b and it is held in transverse direction by the friction produced by the force with which the hook portion 58 is pressed against the outer surface of the bar 26b. The hook portion 58 is elastically deformable thanks to the elastic characteristics of the material constituting the thruster element (preferably constituted by plastic material, which may be reinforced with fibres). Moreover, to make the hook portion 58 elastically deformable, in the attachment portion 54 is provided a transverse through slit 62 which ends on the engagement seat 60.

The hook portion 58 of each thruster element 32, 34 is also provided with disengagement elements 64 constituted for example by two rollers mounted rotatable around a transverse axis positioned at the free end of the hook portion 58. The rollers 64 project laterally relative to the vertical lateral walls of the thruster element 32, 34.

With reference again to FIG. 6, the grip elements 52 have at their lower end inclined invitation surfaces 66 which are destined to co-operate with the rollers 64 to deform elastically the hook portion 58 and temporarily disengage the thruster element 32 from the bars 26a, 26b, in such a way that the thruster element 32 can be moved in transverse direction relative to the bars 26a, 26b.

Figure 3:
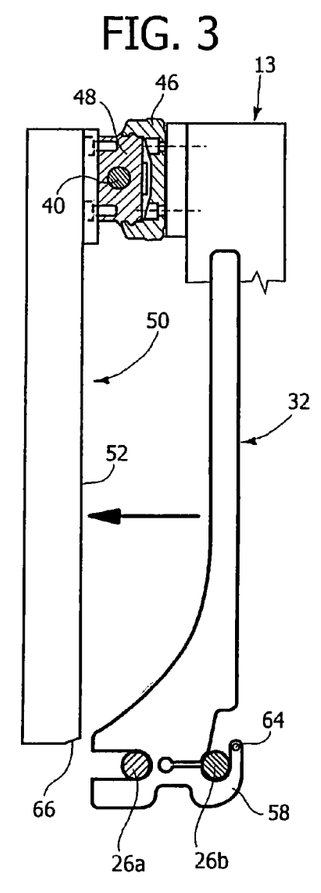
FIGS. 3, 4 and 5 are schematic views illustrating the sequence of operation of the adjustment station indicated by the arrow III in FIG. 1.
Figures 4, 5:
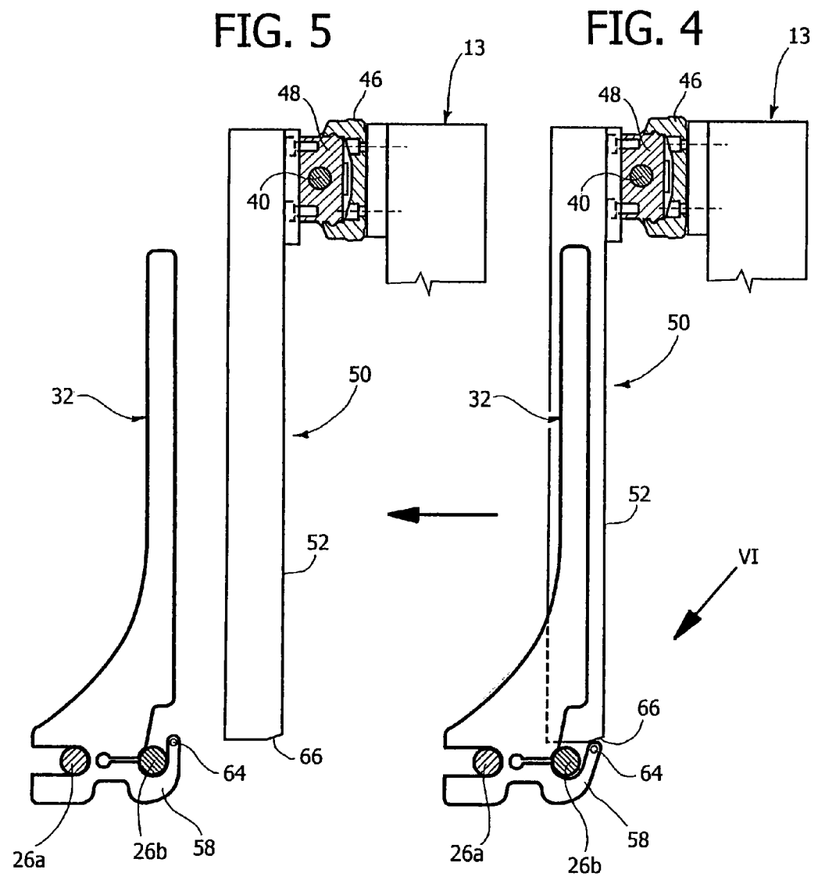

The operation of the adjustment station 38 shall now be described with reference to FIGS. 3, 4 and 5. With reference to FIG. 3, the adjustment assemblies 50 are positioned in transverse direction in such a way that the free space between the two grip elements 52 is exactly along the trajectory of the respective thruster elements 32, 34. The chains 22, 24 are actuated until the thruster elements 32, 34 are positioned between the grip elements 52 of the adjustment assemblies 50 (FIG. 4). During the advance of the thruster elements, the inclined surfaces 66 of the grip elements are on the trajectory of the rollers 64. Therefore, when the thruster elements 32 are between the grip elements 52, the hook portion 58 of the thruster elements 54 is elastically deformed as shown in FIG. 4. In this position, the thruster elements 32 are free to slide in transverse direction relative to the bars 26a, 26b. In this condition, the chains 22, 24 are stopped and the motor that commands the movement in transverse direction of the adjustment assemblies 50 is operated. The grip elements 52 thus move in transverse direction the respective thruster elements 32, 34. The movement in transverse direction ends when the thruster elements 32, 34 have reached their final position.

At this point, the chains 22, 24 are operated again making the thruster elements 32, 34 advance relative to the adjustment assemblies 50. As soon as the rollers 64 of the thruster elements 32, 34 disengage from the lower surfaces of the grip elements 52, the hook portion 58 of each thruster element 32, 34 elastically returns to the gripping position, blocking the thruster element 32, 34 relative to the bars 26a, 26b. This sequence is repeated for the next array of thruster elements, until all thruster elements are in the position corresponding to the new size of the packages. At this point, the adjustment operation is complete and the conveyor device 10 can resume its normal operation.

The adjustment sequence is executed in fully automatic fashion under the control of a command unit which commands the displacement in the transverse direction of the adjustment assemblies 50 and the stepped advance of the chains 22, 24 according to pre-set sequences and according to the size of the package to be obtained.

Figure 7:
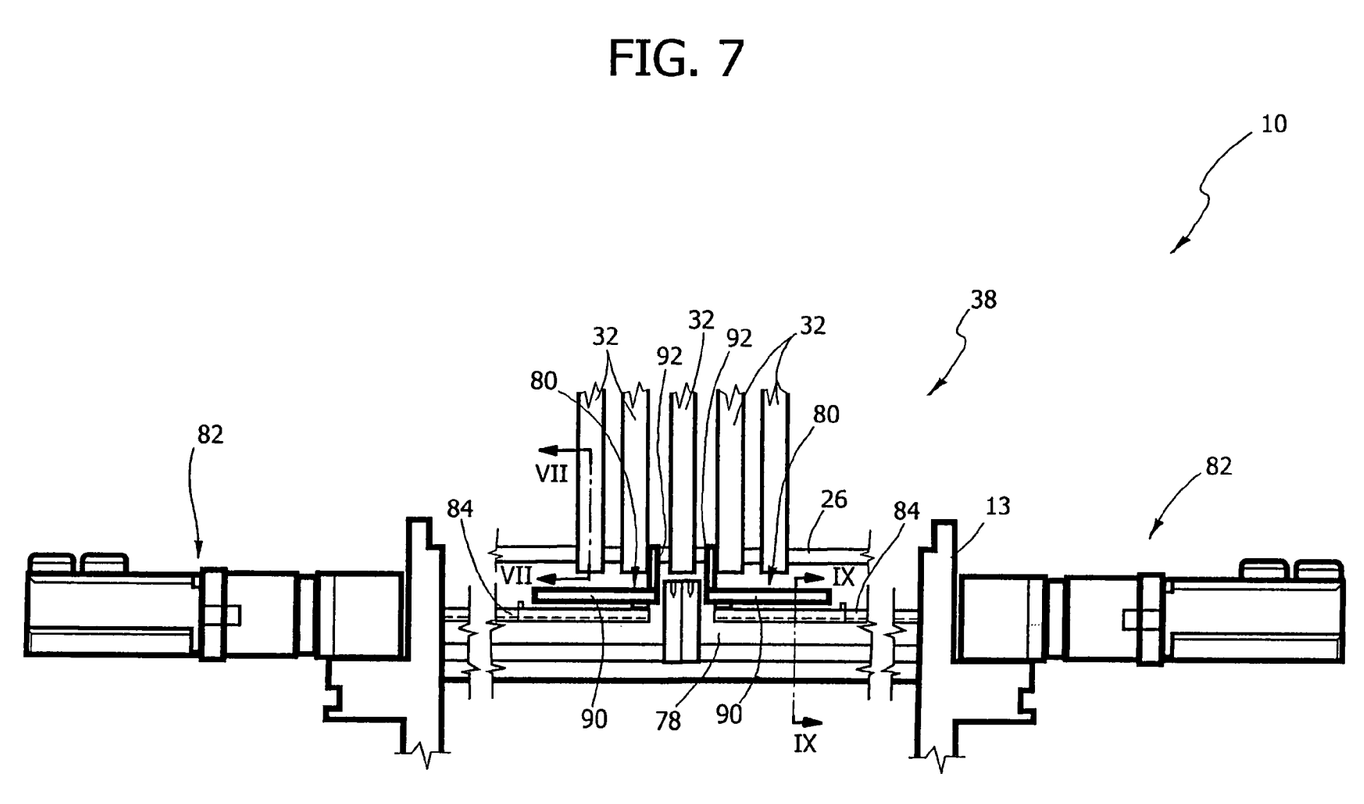
FIG. 7 is a schematic view similar to FIG. 2 showing a second embodiment of the present invention.
Figure 8:
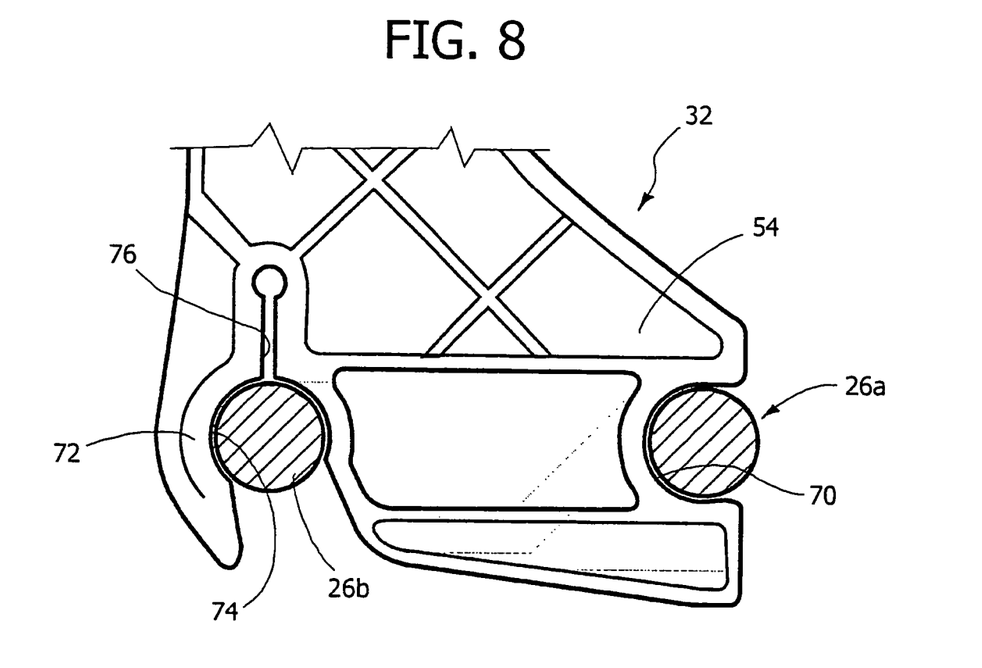
FIGS. 8 and 9 are partial sections respectively according to the lines VIII-VIII and IX-IX of FIG. 7.
Figure 9:
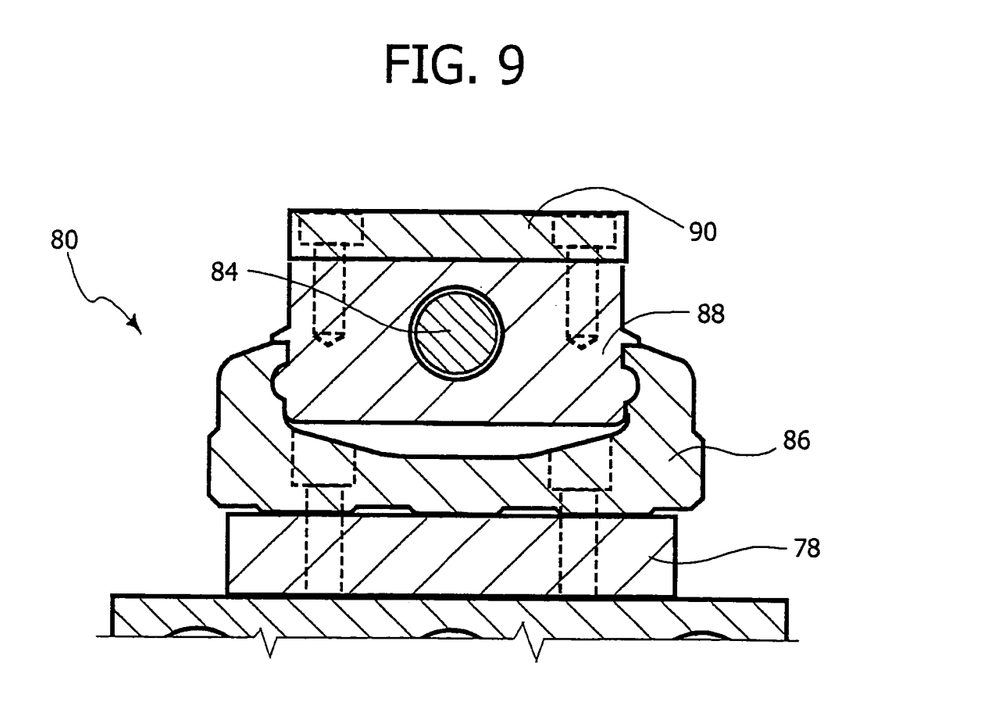

With reference to FIGS. 7-9, a second embodiment of the present invention shall now be described. The components corresponding to those described above are designated by the same numerical references.

With reference to FIG. 8, the attachment portion 54 of each thruster element 32 or 34 has a frontally open seat 70, substantially C-shaped, which engages a first transverse bar 26a and an elastically deformable hook portion 72 with a seat 74 which engages a second transverse bar 26b. The seat 74 communicates with a groove 76 which renders the hook portion 72 elastically yielding.

With reference to FIG. 7, the stationary support structure 13 of the conveyor device 10 is provided at the adjustment station 38 with a transverse beam 78 whereon are mounted two adjustment assemblies 80. Each adjustment assembly 80 comprises an electric motor 82 which actuates in rotation a respective transverse adjustment screw 84.

With reference to FIG. 9, each adjustment assembly 80 comprises a transverse guide 86 fastened to the transverse beam 78. The transverse guide 86 of each adjustment assembly 80 bears a sliding shoe 88 having a threaded hole in which is engaged the respective transverse adjustment screw 84. On each shoe 88 is fastened a grip element 90 having a general "L" configuration. As shown in FIG. 7, each grip element 90 has a vertically projecting portion 92 which is adapted to bear against a flank of a respective thruster element 32 to displace said element in transverse direction along the bars 26a and 26b.

In operation, the vertically projecting portion 92 of each grip element 90 bears against the flank of the attachment portion 54 of a respective thruster element 32 or 34 and drives the thruster element 32 or 34 in transverse direction. The thruster elements 32 or 34 can be driven transversely without preventively unlocking the thruster elements 32 or 34 from the bars 26a or 26b. In fact, if the retaining force exerted by the hook portion 72 of each thruster element 32 or 34 is not too great, the grip element 90 is able to displace the thruster element 32 or 34 without loosening the grip of the hook portion 72 on the bar 26b. If instead the friction force to be overcome to displace the thruster elements 32 or 34 should be too great, the grip element 90 could be configured in such a way as slightly to open the seat 74 of each thruster element 32 or 34 during the displacement in the transverse direction. This can be obtained providing on the front surfaces of the vertically projecting portion 92 some wedge formations which engage the hook portion 72 and elastically spread said hook portion whilst they displace the thruster element 32 in transverse direction.

The invention claimed is:

1. A conveyor device, in particular for an automatic packaging machine for paper rolls, comprising:
   a plane of advance,
   at least one pair of motorised flexible transmission members extending along a closed loop and bearing a plurality of transverse bars fastened to said at least one pair of motorised flexible transmission members,
   a plurality of thruster elements borne by said transverse bars, wherein each thruster element is provided with an elastically deformable hook portion which engages the respective transverse bar in such a way as to block the thruster element relative to said transverse bar, and
   a stationary adjustment station provided with at least one adjustment assembly configured to selectively receive the thruster element, wherein the adjustment assembly includes a shoe having at least two grip elements extending from the shoe, whereby as the shoe moves along a guide, at least one of the grip elements engages and moves the thruster element along the transverse bar between a first position and a second position.

2. The device as claimed in claim 1, wherein the adjustment assembly is positioned in such a way as to disengage temporarily the respective thruster element from the respective transverse bar.

3. The device as claimed in claim 1, wherein said grip elements are parallel grip elements able to receive there between the thruster element when said thruster element is at said adjustment station.

4. The device as claimed in claim 1, wherein each grip element has a vertically projecting portion able to engage a flank of a thruster element.

5. The device as claimed in claim 1, wherein the hook portion is temporarily disengageable from the respective transverse bar when the thruster element is engaged by the respective grip element.

6. The device as claimed in claim 1, wherein said hook portion is provided with engagement elements able to co-operate with a portion of the grip element in order elastically to deform the hook portion.

7. The device as claimed in claim 1, wherein the guide comprises at least one motorised transverse screw able to move the shoe and the grip elements in the transverse direction.

8. A method for automatically adjusting the size of packs in a conveyor device, in particular for an automatic packaging machine for paper rolls, in which the conveyor device comprises at least one pair of flexible transmission members extending along a closed loop and bearing a plurality of transverse bars bearing a plurality of thruster elements, the method comprising:
   arranging an adjustment station along an advancement path of said thruster elements, wherein said adjustment station includes at least one shoe and at least one actuator for moving said shoe along a guide extending transversely to said transmission members, and wherein said shoe is provided with at least one grip element;
   positioning at least one of the plurality of thruster elements adjacent the at least one grip element;
   selectively engaging the thruster element and the at least one grip element;
   temporarily disengaging the thruster element from the respective transverse bars by means of said grip element;
   selectively transversely positioning said engaged thruster elements by moving said grip element and said shoe along said guide; and
   moving said transverse bar out of said adjustment station once the thruster elements supported by said transverse bar have been transversely positioned along the transverse bar.

9. The method as claimed in claim 8, wherein said transverse bars are sequentially positioned in said adjustment station for transversely positioning the thruster elements of each said transverse bar.

10. The method as claimed in claim 8, wherein a hook portion of the thruster element is elastically deformed upon the temporary disengagement of the thruster element from the respective transverse bar.

* * * * *

UNITED STATES PATENT AND TRADEMARK OFFICE
CERTIFICATE OF CORRECTION

PATENT NO. : 7,789,219 B2  Page 1 of 1
APPLICATION NO. : 11/241348
DATED : September 7, 2010
INVENTOR(S) : Baldanza et al.

It is certified that error appears in the above-identified patent and that said Letters Patent is hereby corrected as shown below:

On the Title Page: In the Foreign Application Priority Data Item (30):

Please insert --Oct. 15, 2004 (EP) ............... 04425779--.

Signed and Sealed this
Eighteenth Day of January, 2011

David J. Kappos
*Director of the United States Patent and Trademark Office*